United States Patent [19]

Schrödter et al.

[11] Patent Number: 4,511,546

[45] Date of Patent: Apr. 16, 1985

[54] LINEAR, SUBSTANTIALLY WATER-INSOLUBLE AMMONIUM POLYPHOSPHATES AND PROCESS FOR MAKING THEM

[75] Inventors: Klaus Schrödter, Cologne; Alexander Maurer, Hürth, both of Fed. Rep. of Germany

[73] Assignee: Hoechst Aktiengesellschaft, Fed. Rep. of Germany

[21] Appl. No.: 464,982

[22] Filed: Feb. 8, 1983

[30] Foreign Application Priority Data

Mar. 6, 1982 [DE] Fed. Rep. of Germany ....... 3208202

[51] Int. Cl.$^3$ .............................................. C01B 25/30
[52] U.S. Cl. ..................................... 423/305; 423/315
[58] Field of Search ................. 423/315, 305

[56] References Cited

U.S. PATENT DOCUMENTS

| 3,333,921 | 8/1967 | Knollmueller | 423/315 |
| 3,723,074 | 3/1973 | Sears et al. | 423/315 |
| 3,978,195 | 8/1976 | Schrödter et al. | 423/305 |
| 4,396,586 | 8/1983 | Maurer et al. | 423/315 |

FOREIGN PATENT DOCUMENTS

| 30356 | 8/1974 | Japan | 423/315 |
| 7405909 | 12/1974 | Netherlands | 423/315 |
| 7503884 | 10/1975 | Netherlands | 423/315 |

*Primary Examiner*—John Doll
*Assistant Examiner*—Wayne A. Langel
*Attorney, Agent, or Firm*—Connolly and Hutz

[57] ABSTRACT

The disclosure relates to a process for making linear, substantially water-insoluble ammonium polyphosphates of the general formula $(NH_4PO_3)_{10-1000}$ by heating and continuously mixing phosphorus pentoxide and ammonium orthophosphate in the presence of ammonia and tempering the resulting reaction product over a period of several hours at 200° to 400° C. in the presence of ammonia. To this end, the phosphorus pentoxide and ammonium orthophosphate are subjected at 50° to 150° C. to the following successive operations which provide (a) for them to be reacted with ammonia over a period of 5 to 15 minutes under an overpressure of 1-2 millibars,
(b) for them to be mixed under nitrogen for 10 to 60 minutes at atmospheric pressure while arresting the supply of ammonia,
(c) for them to be reacted with ammonia over a period of 1 to 3 hours under a pressure 1 to 5 millibars lower than atmospheric pressure, and the reaction product is tempered, the ammonia being used in an overall stoichiometric excess of at most 20 mol %.

The disclosure is also concerned with the ammonium polyphosphates so obtainable which are characterized by the following typical data which provide:

(a) for the solubility of a 10 weight % suspension in pure water at 25° C. to be less than 0.8 g per 100 g suspension;
(b) for the viscosity of a 10 weight % suspension in pure water at 25° C. to be at most 100 mPa.s;
(c) for the viscosity of a 30 weight % suspension in a polyesterpolyol at 25° C. to be at most 50 Pa.s.

2 Claims, No Drawings

LINEAR, SUBSTANTIALLY WATER-INSOLUBLE AMMONIUM POLYPHOSPHATES AND PROCESS FOR MAKING THEM

The invention relates to a process for making linear, substantially water-insoluble ammonium polyphosphates of the general formula $(NH_4PO_3)_{10-1000}$ by heating and continuously mixing phosphorus pentoxide and ammonium orthophosphate in a molar ratio of 1:0.9 to 1:1.1 in the presence of ammonia, and tempering the reaction product over a period of several hours at 200° to 400° C. in the presence of ammonia with the resultant formation of ammonium polyphosphate of which a suspension in water or a polester polyol has a fairly low viscosity.

Ammonium polyphosphate—briefly termed APP hereinafter—has been produced for some time in commercial quantities for use especially in flameproofing plastics and painting compositions. As regards processability, the APP produced heretofore does not satisfactorily comply with the requirements of the consumers. Depending on the use the material is put to, it is desirable to have an aqueous or organic suspension of APP of fairly low viscosity permitting it to be processed in the necessary concentration. In order to have products with defined flame-retardant properties, it is necessary for these products to have a certain minimum quantity of APP contained therein, which cannot be reduced without significant adverse effects on the flame-retardant properties.

In addition to this, it is desirable for the APP to be rather scarcely soluble in water. As a result, APP is less liable to be washed out from the respective product, and the durability of flame-retardant effect is improved.

For these reasons, it is highly desirable to have APP of minor solubility in water and low viscosity in the form of an aqueous and organic suspension, respectively.

A process and apparatus for making substantially water-insoluble, linear ammonium polyphosphates has already been described in German Patent DE-C No. 23 30 174, wherein ammonium orthophosphate and $P_2O_5$ are reacted in a reactor provided with variable mixing means with an excess of ammonia (Examples 1 to 3 = 33 mol%; Example 5 = 56 mol%; Example 6 = 13 mol% $NH_3$-excess) at 170° to 350° C., preferably 200° to 270° C. Products with decreasing water-solubility are obtained at increasing reaction temperature. Data relating to the viscosity of APP-suspensions have not been disclosed in the Patent just cited. Experimental work made on these prior aqueous and organic APP-suspensions (cf. comparative Example 4 hereinafter) has shown them to have undesirably high viscosity values. While it would appear from DE-C No. 23 30 174 that the 1% APP-suspension in water at 25° C. has an extremely low solubility (0.67 to 3.8 weight%, i.e. 6.7 to 38 mg dissolved APP in 100 g suspension) it should not be ignored that these solubilities were determined by a prior method with ammonium chloride addition (cf. European Patent Application No. 81 107 108.3, page 4, lines 15-17, and Example 5).

This earlier-filed European Patent Application No. 81 107 108.3 (corresponding to German Patent Application P No. 30 38 836.4) also describes a process for making long-chain ammonium polyphosphate by reacting approximately equimolar proportions of ammonium orthophosphate and $P_2O_5$ while adding 0.1 to 15 mol% melamine, based on $P_2O_5$, at 50° to 150° C. in the presence of an excess of ammonia, and tempering the reaction product at 200° to 400° C. The ammonia is used in an excess of 114 mol%. An adverse effect of this process resides in the need to additionally use a condensing agent (melamine or its condensation products) and in the use of a high excess of ammonia; despite this, the solubility of a 10% aqueous suspension of still 8 to 12 weight% (=0.8 to 1.2 g dissolved APP in 100 g suspension) is not fully satisfactory.

The present invention comprises more particularly: subjecting the phosphorus pentoxide and ammonium orthophosphate at 50° to 150° C. to the following successive operations which provide (a) for them to be reacted with ammonia over a period of 5 to 15 minutes under an overpressure of 1-2 millibars, (b) for them to be mixed under nitrogen for 10 to 60 minutes at atmospheric pressure while arresting the supply of ammonia, (c) for them to be reacted with ammonia over a period of 1 to 3 hours under a pressure 1 to 5 millibars lower than atmospheric pressure, and tempering the reaction product, the ammonia being used in an overall stoichiometric excess of at most 20 mol%, preferably of at most 10 mol%.

The invention also relates to linear ammonium polyphosphates of the general formula $(NH_4PO_3)_{10-1000}$, which are obtainable by the present process and characterized by the following typical data which provide:

(a) for the solubility of a 10 weight% suspension in pure water at 25° C. to be less than 0.8 g per 100 g suspension;

(b) for the viscosity of a 10 weight% suspension in pure water at 25° C. to be at most 100 mPa.s;

(c) for the viscosity of a 30 weight% suspension in a polyesterpolyol at 25° C. to be at most 50 Pa.s.

The reaction occurs in accordance with the following known summation equations:

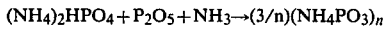

$(NH_4)_2HPO_4 + P_2O_5 + NH_3 \rightarrow (3/n)(NH_4PO_3)_n$ or

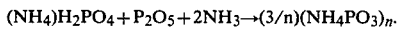

$(NH_4)H_2PO_4 + P_2O_5 + 2NH_3 \rightarrow (3/n)(NH_4PO_3)_n$.

The invention is based on the observation not described heretofore that the reaction of ammonium orthophosphate and $P_2O_5$ with gaseous ammonia occurs in two reaction phases which take place separately from one another, in respect of time. Upon the addition of ammonia to the solid matter mixture at 50° to 150° C., strong $NH_3$-absorption indicates the start of the first reaction phase. After about 10 minutes, considerably less ammonia is needed, indicating the end of this reaction phase. Upon the continued undiminished supply of $NH_3$, the reaction product is found regularly to absorb ammonia until spontaneous commencement after altogether 1 to 1.5 hours of a second strong $NH_3$-absorption rate (second reaction phase). In order to obtain APP having the desired properties, it is invariably necessary to take the following operational steps, namely after the first reaction phase to mix the whole over a period of 10 to 60 minutes without supply of $NH_3$ and, during the second reaction phase which takes 1 to 3 hours, to throttle the supply of $NH_3$ so as to establish a pressure 1 to 5 millibars lower than atmospheric pressure inside the reactor. The $NH_3$-deficiency during this phase prevents the reaction from occurring too violently and rapidly which would incidentally result in the formation of products having undesirable properties.

APP made in accordance with this invention has a low viscosity in aqueous and also in organic suspension, e.g. in a polyester polyol. A 10% aqueous suspension of APP made e.g. by the process described in German Patent DE-C No. 23 30 174 has viscosity values considerably higher than 1000 mPa.s, whilst the APP of this invention has viscosity values of less than 100 mPa.s, and even less than 50 mPa.s. The products behave similarly in organic solvents, e.g. a polyester polyol, in which APP of this invention has a viscosity about 50% lower than that of APP made as described in German Patent DE-C No. 23 30 174. A still further advantage in which APP of this invention compares favorably with a product made as described in German Patent DE-C No. 23 30 174 resides in its distinctly reduced solubility in pure water which beneficially influences the flameproofing properties of the product; in other words, the product is less liable to be washed out from a system and the stability of the flameproofing system as a whole is improved.

For technical reasons, it is desirable for a 1 weight% aqueous APP-suspension to have a pH-value of about 6. This requirement is met by the product of this invention.

The present process also compares favorably under economic aspects with the processes described in German Patent No. 23 30 174 and European Patent Application No. 81 107 108.3 as the principal reaction occurs during the longer second phase without use of ammonia in excess whereby the whole $NH_3$-consumption becomes significantly reduced.

EXAMPLE 1

350 kg $P_2O_5$ (2.54 kilomols) and 335 kg $(NH_4)_2HPO_4$ (2.54 kilomols) were introduced into a reactor which had a capacity of 1 cubic meter and was provided with rotating mixing and kneading elements. The material was heated to 100° C., ammonia was added and an overpressure of 1–2 millibars was maintained inside the reactor by means of an automatic pressure regulator. 19 m$^3$ $NH_3$ was absorbed and the first reaction phase terminated after 15 minutes. Next, the reaction mixture was stirred for 45 minutes under nitrogen while the supply of ammonia was arrested. During the second reaction phase which then set in and took 2 hours, 25 m$^3$ $NH_3$ was introduced under a pressure 1 to 3 millibars lower than atmospheric pressure. Next, the material was tempered for 2 hours at 230° C. with consumption of 18 m$^3$ $NH_3$ at atmospheric pressure. The total consumption of ammonia was 62 m$^3$ (determined at 0° C. and 1.013 bar), corresponding to a stoichiometric excess of 8.77 mol%. The APP so obtained had the properties indicated in the Table hereinafter.

EXAMPLE 2 (Comparative Example)

The procedure was as in Example 1 but 42 m$^3$ $NH_3$ was admitted during the second reaction phase under an overpressure of up to 1 millibar. After the tempering treatment, APP of higher solubility in water and less favorable viscosity behaviour in aqueous and organic suspension was obtained. The total consumption of $NH_3$ was 81 m$^3$ (determined at 0° C. and 1.013 bar), corresponding to a stoichiometric excess of 42.1 mol%.

EXAMPLE 3 (Comparative Example)

The procedure was as in Example 1 but the step of stirring the reaction mixture for 45 minutes under nitrogen during the two reaction phases was omitted. The APP so obtained compared unfavorably qualitatively with the APP of Example 1.

EXAMPLE 4 (Comparative Example carried out in accordance with conditions described in German Patent DE-C No. 23 30 174, Example 1)

360 kg $P_2O_5$ (2.54 kilomols) and 335 kg $(NH_4)_2HPO_4$ (2.54 kilomols) were introduced into a reactor which had a capacity of 1 m$^3$ and was provided with rotating mixing and kneading elements. The reactor was initially supplied during 1 hour at 265° C. with 50.5 m$^3$ $NH_3$ and then during 2 hours with 25.25 m$^3$ $NH_3$. After altogether 3 hours, crystalline APP whose properties were not satisfactory was taken from the reactor. $NH_3$ was used in a total quantity of 75.75 m$^3$ (determined at 0° C. and 1.013 bar), corresponding to a stoichiometric excess of 33 mol%.

TABLE

| APP of Example No. | 1 | 2 | 3 | 4 |
|---|---|---|---|---|
| pH-value of 1 wgt % aqueous suspension | 6.1 | 5.5 | 5.8 | 5.6 |
| Solubility at 25° C. in 10 wgt % aqueous suspension | | | | |
| (a) in % suspended APP | 5 | 17 | 14 | 23 |
| (b) in g per 100 g suspension | 0.5 | 1.7 | 1.4 | 2.3 |
| Viscosity of 10 wgt % aqueous suspension (mPa · s) at 25° C. | 37 | 380 | 180 | 1860 |
| Viscosity of 30 wgt % suspension in adipic acid diethyleneglycol-polyester (Pa · s) at 25° C. | 39 | 53 | 50 | 74 |

We claim:

1. A process for making linear, substantially water-insoluble ammonium polyphosphates of the general formula $(NH_4PO_3)_{10-1000}$ by heating and continuously mixing phosphorus pentoxide and ammonium orthophosphate in a molar ratio of 1:0.9 to 1:1.1 in the presence of ammonia and tempering the resulting reaction product over a period of several hours at 200° to 400° C. in the presence of ammonia which comprises subjecting the phosphorus pentoxide and ammonium orthophosphate at 50° to 150° C. to the following successive operations which provide
   (a) for them to be reacted with ammonia over a period of 5 to 15 minutes under an overpressure of 1–2 millibars,
   (b) for them to be mixed under nitrogen for 10 to 60 minutes at atmospheric pressure while arresting the supply of ammonia,
   (c) for them to be reacted with ammonia over a period of 1 to 3 hours under a pressure 1 to 5 millibars lower than atmospheric pressure, and tempering the reaction product, the ammonia being used in an overall stoichiometric excess of at most 20 mol%.

2. A process as claimed in claim 1, wherein the ammonia is used in an overall stoichiometric excess of at most 10 mol%.

* * * * *